(12) United States Patent
Dunn, Jr. et al.

(10) Patent No.: US 7,588,741 B2
(45) Date of Patent: Sep. 15, 2009

(54) CYCLICAL VACUUM CHLORINATION PROCESSES, INCLUDING LITHIUM EXTRACTION

(76) Inventors: Wendell E. Dunn, Jr., 10686 Billie La., Lead, SD (US) 57754; Jeffrey Van Jahnke, 80 Whippoorwill La., Mill Spring, NC (US) 28756

( * ) Notice: Subject to any disclaimer, the term of this patent is extended or adjusted under 35 U.S.C. 154(b) by 746 days.

(21) Appl. No.: 11/092,286

(22) Filed: Mar. 28, 2005

(65) Prior Publication Data

US 2005/0220691 A1    Oct. 6, 2005

Related U.S. Application Data

(60) Provisional application No. 60/558,074, filed on Mar. 30, 2004, provisional application No. 60/558,075, filed on Mar. 30, 2004.

(51) Int. Cl.
*C01F 7/00* (2006.01)
(52) U.S. Cl. ............... 423/74; 423/148; 423/179.5; 423/328.1; 423/328.2; 423/341; 423/342; 423/499.3; 423/495
(58) Field of Classification Search ........ 423/74, 423/148, 179.5, 328.1, 328.2, 499.3, 495, 423/341, 342
See application file for complete search history.

(56) References Cited

U.S. PATENT DOCUMENTS

| | | | |
|---|---|---|---|
| 2,561,439 A | 7/1951 | Erasmus |
| 2,856,264 A | 10/1958 | Dunn, Jr. |
| 2,985,507 A | 5/1961 | Wienert |
| 3,729,544 A | 4/1973 | Svanstrom |
| 3,842,163 A | 10/1974 | Russell et al |
| 3,977,862 A | 8/1976 | Glaeser |
| 4,066,424 A | 1/1978 | Kilgren et al. |
| 4,134,860 A | 1/1979 | Hindin et al. |
| 4,187,210 A | 2/1980 | Howard, Jr. |
| 4,327,062 A | 4/1982 | Iwai et al. |
| 4,442,076 A | 4/1984 | Bonsack |
| 4,487,677 A | 12/1984 | Murphy |
| 4,521,385 A | 6/1985 | Brandstatter |
| 4,540,551 A | 9/1985 | Bonsack et al. |
| 4,569,720 A | 2/1986 | Schmitkons et al. |
| 4,652,434 A | 3/1987 | Bonsack et al. |
| 4,780,186 A | 10/1988 | Christini et al. |
| 4,888,052 A | 12/1989 | Harris et al. |
| 5,004,500 A | 4/1991 | Dunn, Jr. et al. |
| 5,350,717 A | 9/1994 | Day et al. |
| 5,935,545 A | 8/1999 | Leary et al. |
| 5,981,427 A | 11/1999 | Sung et al. |
| 5,989,507 A | 11/1999 | Sung et al. |
| 5,993,759 A | 11/1999 | Wilkomirsky |
| 6,048,507 A | 4/2000 | Amouzegar et al. |
| 6,136,281 A | 10/2000 | Meischen et al. |
| 2001/0026838 A1 | 10/2001 | Dettling et al. |
| 2001/0028871 A1 | 10/2001 | Harrison et al. |
| 2002/0104406 A1 | 8/2002 | Hollitt et al. |
| 2003/0129113 A1 | 7/2003 | Hollitt et al. |
| 2004/0035249 A1 | 2/2004 | Harris et al. |
| 2004/0087439 A1 | 5/2004 | Hwang et al. |
| 2004/0103751 A1 | 6/2004 | Joseph et al. |

OTHER PUBLICATIONS

International Search Report from corresponding application PCT/US2005/010273 published on Oct. 13, 2005 as No. WO 2005/094289.

*Primary Examiner*—Steven Bos
(74) *Attorney, Agent, or Firm*—Carter, Schnedler & Warnock, P.A.

(57) ABSTRACT

Cyclical batch processes for halogenation, such as chlorination, of minerals in a fixed bed using a plurality of cycles which include the steps of at least partially evacuating the bed, charging the bed with reactant gas, maintaining the reactant gas in the bed for a predetermined time, and exhausting reaction products under vacuum. Also disclosed is the chlorination of spodumene in its beta crystalline form produced by calcining spodumene in its naturally-occurring alpha crystalline form to preferentially extract lithium as lithium chloride.

28 Claims, 4 Drawing Sheets

CYCLICAL VACUUM CHLORINATION PROCESSES, INCLUDING LITHIUM EXTRACTION

CROSS-REFERENCE TO RELATED APPLICATIONS

The benefit of U.S. Provisional Patent Application Ser. Nos. 60/558,074 and 60/558,075, both filed Mar. 30, 2004, is claimed.

BACKGROUND OF THE INVENTION

The invention relates to high temperature halogenation of minerals for purposes such as removing impurities to beneficiate minerals, and recovering values, for example lithium as lithium chloride (LiCl), as well as other by-product chlorides, from lithium ore.

The field of high temperature chlorination of minerals, or, more generally, halogenation, traditionally involves fluidized reactors, shaft flow reactors and conveying reactors where the solids and reaction gases are transported as they pass through a reaction vessel. Chlorination in particular is used to extract metallic elements as chlorides from minerals either to recover values or to remove impurities and beneficiate substances. High temperature chlorination is an important process for producing titanium, where, as an example, titanium tetrachloride ($TiCl_4$) is produced by reacting titanium ore such as ilmenite ($FeTiO_3$) or rutile (impure $TiO_2$) with carbon and chlorine in a furnace. Titanium metal is then produced by reducing the titanium tetrachloride with magnesium. Titanium pigment ($TiO_2$), another commercially important product, is produced by oxidizing the titanium tetrachloride.

Reactors currently in use for high temperature halogenation include fluidized bed reactors, shaft flow reactors, and conveying reactors where solids and reaction gases are transported through a reactor vessel. Various such reactors are operated in steady state or batch modes at atmospheric or elevated pressures. Products of currently-operated chlorination reactors generally are removed from the reactor by using the pressure differential of the exiting gases; bed solids are dumped or flow by gravity from the reactor.

SUMMARY OF THE INVENTION

In one aspect, a process for halogenation of a mineral is provided. A reactor is charged with particles produced from the mineral to form a bed. For a plurality of cycles, the steps of evacuating the reactor under at least a partial vacuum, introducing a reactant gas including a halogen into the reactor, maintaining the reactant gas within the reactor and in contact with the particles for a predetermined reaction time, and removing gaseous reaction products from the reactor under at least a partial vacuum are cycled through.

In another aspect, a process for chlorination of spodumene is provided. A reactor is charged with spodumene particles mixed with carbon particles as a reductant to form a bed. For a plurality of cycles, the steps of evacuating the reactor under at least a partial vacuum, introducing chlorine as a reactant gas into the reactor, maintaining the reactant gas within the reactor and in contact with the particles for a predetermined reaction time, and removing gaseous reaction products from the reactor under at least a partial vacuum are cycled through.

In another aspect, a process for chlorination of spodumene is provided. A reactor is charged with spodumene particles to form a bed. For a plurality of cycles, the steps of evacuating the reactor under at least a partial vacuum, introducing chlorine as a reactant gas mixed with carbon as a reductant in the form of carbon monoxide gas into the reactor, maintaining the reactant gas within the reactor and in contact with the particles for a predetermined reaction time, and removing gaseous reaction products from the reactor under at least a partial vacuum are cycled through.

In another aspect, a process for extracting lithium as lithium chloride from lithium ore is provided. A reactor is charged with particles produced from the ore to form a bed, and the reactor and bed are heated. For a plurality of cycles, the steps of evacuating the reactor under at least a partial vacuum, introducing chlorine gas into the reactor, maintaining reactant gas within the reactor and in contact with the particles for a predetermined reaction time; and removing reaction products including lithium chloride, as a gas, from the reactor under at least a partial vacuum are cycled through.

In yet another aspect, a process for extracting lithium as lithium chloride from lithium ore in the form of spodumene is provided. The spodumene is calcined to produce beta spodumene, which is then chlorinated in a reactor. Reaction products including lithium chloride are removed from the reactor.

In still another aspect, an alumino silicate material having a beta spodumene crystal structure but with at least 90% of the lithium removed is produced by providing alpha spodumene; calcining the alpha spodumene to produce beta spodumene; forming a bed of beta spodumene particles; and chlorinating the bed to remove lithium as lithium chloride.

DETAILED DESCRIPTION

Briefly and in overview, embodiments of the invention employ a cyclical batch process, aided by vacuum, for the halogenation, such as chlorination, of particulate materials of fine particle size produced from inorganic minerals. The particulate material may either be naturally occurring or may be produced by deliberate crushing. The particles may be from a froth flotation process, and extremely fine. Particle size reduction increases surface area (surface to volume ratio) for the purpose of increasing the rate and degree of completion of reaction with a reactant gas, such as chlorine. The particle size can be smaller than is feasible in the case of a fluidized bed; if particles in a fluidized bed are too small, they undesirably are carried away by the gas stream. As noted above, high temperature chlorination of inorganic minerals is useful for the purposes of removing impurities to beneficiate minerals, and recovering values.

In embodiments of the invention, a reactor is charged with particles produced from the mineral, which can be fine particles such as −325 mesh (44 μm) particles, to form a bed. A cyclical batch process includes, for a plurality of cycles, repeatedly cycling through the steps of (a) evacuating the reactor under at least a partial vacuum, (b) introducing a reactant gas into the reactor to fill the interstices of the fixed bed, (c) maintaining the reactant gas within the reactor and in contact with the particles for a predetermined reaction time (reaction phase) during which the bed is fixed, and (d) removing gaseous reaction products and unreacted reactant gas from the reactor under at least a partial vacuum. In the repeated cyclical process, the final step (d) of removing gaseous reaction products and unreacted reactant gas from the reactor under at least a partial vacuum merges into the initial step (a) of evacuating the reactor under at least a partial vacuum of the next cycle. The introduction of the reactant gas (e.g. chlorine) may be either from the top or from the bottom of the bed, slowly to avoid entraining the bed particles. Likewise, evacuation of the reactor may be either from the top or from the bottom of the bed.

Important embodiments of the invention relate to the extraction of lithium as lithium chloride (LiCl) from lithium ore, such as spodumene, which in its pure form is lithium aluminum silicate ($LiAlSi_2O_6$). Spodumene naturally occurs as the alpha crystalline phase, but can be changed to the beta crystalline phase by calcining at a minimum temperature of 1040° C. As is described in detail hereinbelow, when beta spodumene is chlorinated at a temperature in the order of 1000° C., lithium is preferentially removed, with very little of the other components (aluminum and silicon) forming chlorides. The rate of lithium extraction by chlorination of beta spodumene is approximately ten times the rate of lithium extraction by chlorination of alpha spodumene. The high selectivity for extraction of lithium when the beta crystalline phase of spodumene is chlorinated is employed to significant advantage.

Figure 1:
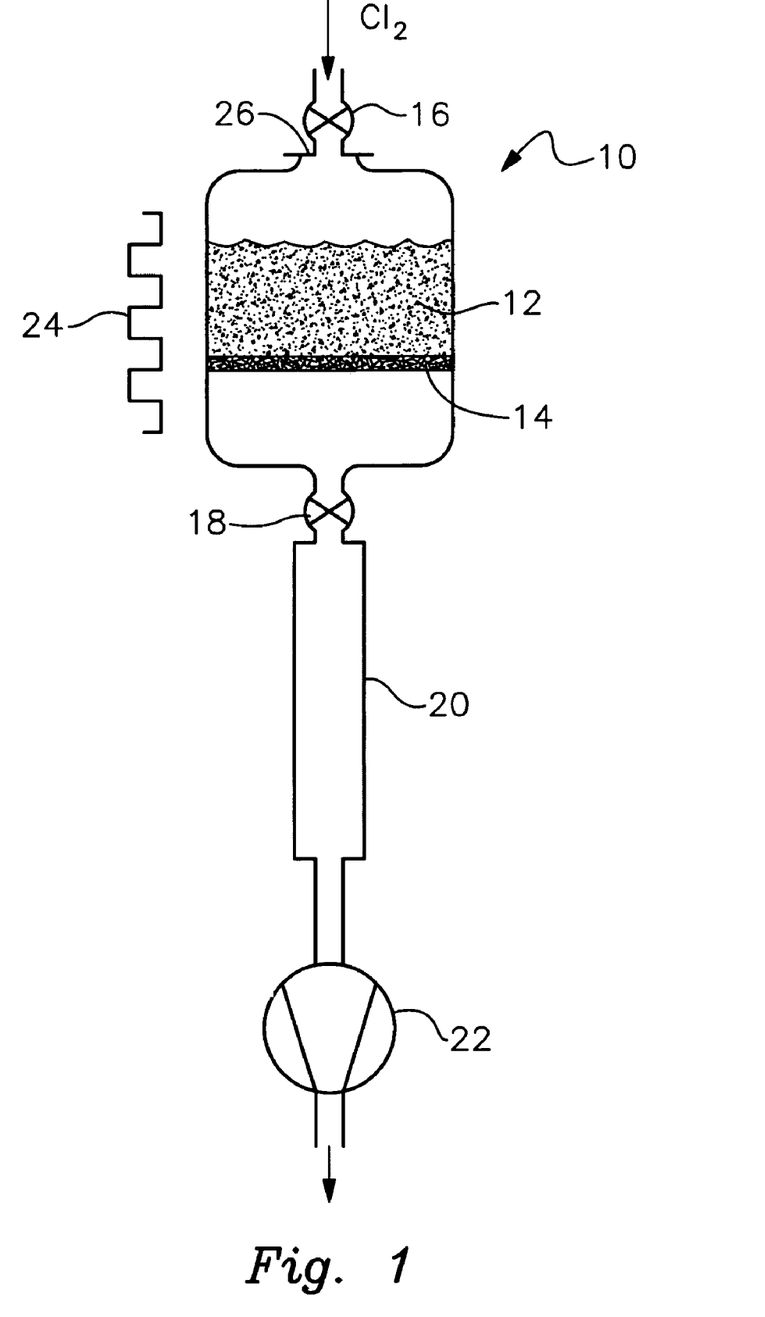
FIG. 1 is a schematic representation of apparatus for halogenation of an inorganic mineral, employing a downflow reactor wherein a vacuum is pulled from under a bed and reactant gas is introduced from above the bed.

More particularly, and with reference now to the schematic representation of FIG. 1, a downflow reactor 10 is charged with particles to form a fixed bed 12, supported against gravity by a gas-permeable support 14. As an example, the gas-permeable support 14 may comprise a body of porous glass or ceramic foam, having an average pore size in the order of 100 microns. The reactor 10 has an inlet valve 16 through which reactant gas is introduced; and an outlet valve 18, downstream of which are a condenser 20 and a vacuum pump 22. The reactor 10 is heated, as represented by an electrical resistance heating element 24. However, a fueled-combustion heat source may as well be provided, employing for example combustion of carbon monoxide and/or carbon with oxygen. Within the downflow reactor 10, heating may also be accomplished by placing coarse carbon particulate on top of the bed 12, introducing oxygen, and igniting. A downflow draft would be required for heat transfer through the bed 12. Representative access to the interior of the reactor 10 is via a removable lid 26. The condenser 20 may operate at room temperature, or may be chilled, depending upon the particular reaction products being recovered.

Figure 2:
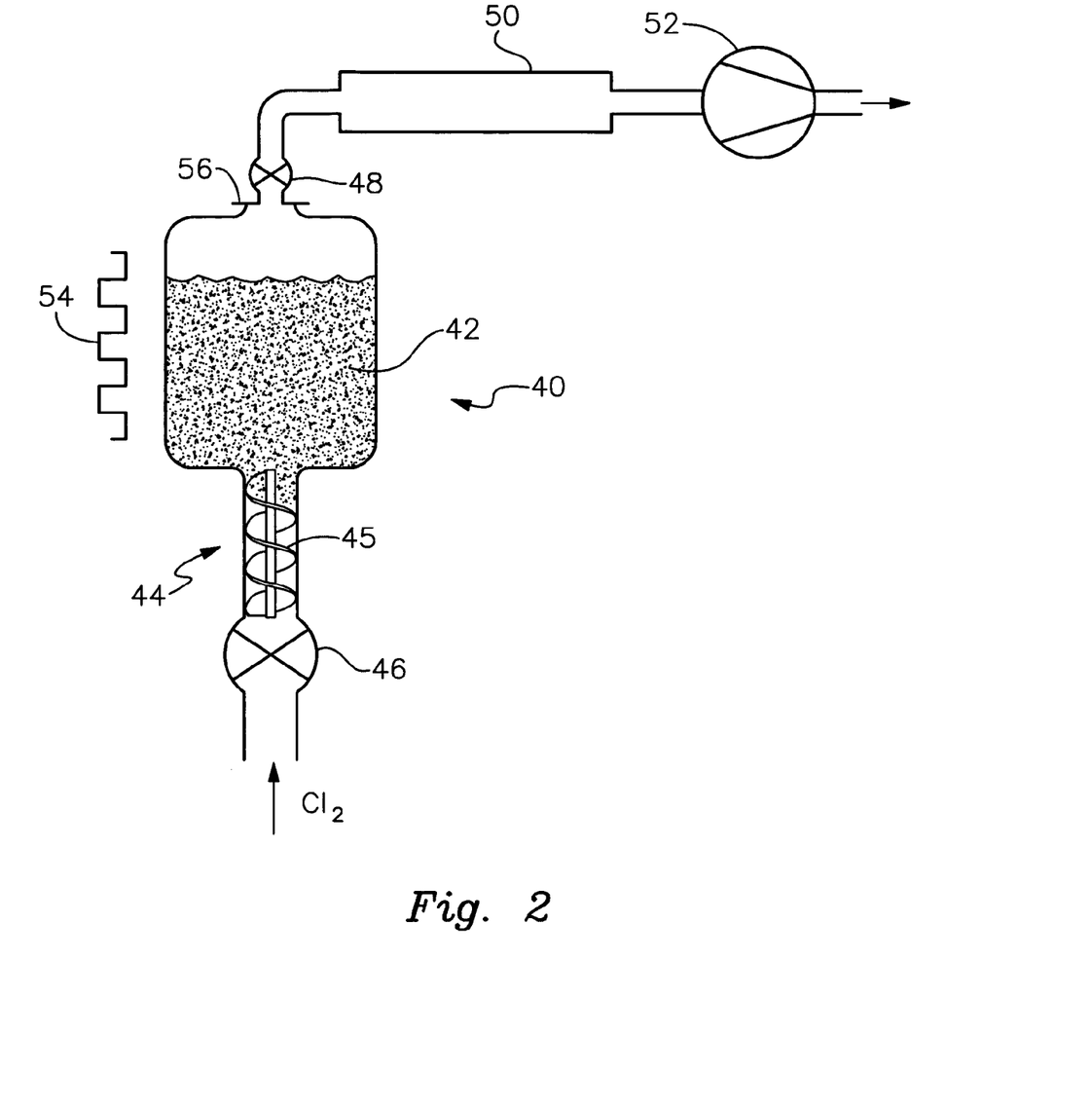
FIG. 2 is a schematic representation of apparatus for halogenation of an inorganic mineral, employing an upflow reactor wherein a vacuum is pulled from above a bed and reactant gas is introduced from under the bed, and which includes a representation of a gas-permeable barrier which employs mechanical properties to allow the flow of gas, while preventing the flow of particulate material.

As an alternative to a body of porous glass or ceramic foam, the gas permeable support 14 in FIG. 1 may comprise a mechanical device such as the helix device shown in representative form in FIG. 2, and described in greater detail in Dunn, Jr. U.S. Pat. No. 2,856,264. Such a mechanical device functions based on the angle of repose of the particulate bed 12 material.

To commence operation, the representative lid 26 is removed and the reactor 10 is charged thorough the resultant opening to form the bed 12. In many chlorination processes carbon is required as a reductant. The carbon may be provided as carbon particles, both coarse and fines, mixed in with the particulate mineral which forms the bed 12. Alternatively, carbon as a reductant may be supplied in gaseous form as carbon monoxide (CO) mixed with the chlorine gas. The reactor 10 and bed 12 are heated to a temperature at which chlorination, as an example, can occur. This is typically within the range of 250° C. to 1100° C. (Gold chlorinates at approximately 275° C.; iron between 650° and 850° C.; and lithium at approximately 1050° C.) The inlet valve 16 is closed, while the outlet valve 18 is opened and the vacuum pump 22 operated to initially evacuate the reactor 10 under at least a partial vacuum. A typical degree of vacuum is 1.0 inch (25.4 mm) Hg. The outlet valve 18 is closed, and reactant gas is introduced into the reactor 10 thorough the inlet valve 16. In FIG. 1, the reactant gas is indicated as chlorine ($Cl_2$). A mixture of chlorine and carbon monoxide ($Cl_2$+CO) may alternatively be introduced through the inlet valve 16. Both valves 14 and 16 are closed for the predetermined reaction time (reaction phase), typically several minutes. At the end of the predetermined reaction time, the outlet valve 18 is opened, and gaseous reaction products (as well as unreacted chlorine) at high temperature flow out of the reactor into the condenser 20, and condense typically to solids as the reaction products are cooled. This evacuation of the reactor 10 through the condenser 20 is aided by the vacuum pump 22 and accordingly is under at least a partial vacuum. In typical embodiments, vacuum sufficient to vaporize all halide (e.g. chloride) reaction products is employed. A typical degree of vacuum is 1.0 inch (25.4 mm) Hg. The process continues with additional cycles, with the final step of evacuating the reactor 10 through the condenser 20 merging into the step in which the outlet valve 18 is opened and the vacuum pump 22 operated to initially evacuate the reactor 10 under at least a partial vacuum.

With reference to FIG. 2, in another embodiment an upflow reactor 40 is charged with particles to form a fixed bed 42, supported against gravity by a gas-permeable support generally designated 44, and which more particularly takes the form of a helix device 45 shown in representative form described in greater detail in Dunn, Jr. U.S. Pat. No. 2,856,264. Such a mechanical device functions based on the angle of repose of the particulate bed 12 material. For discharging any remaining bed material, the helix device 45 can be raised or lowered, leaving an unobstructed passageway. The reactor 40 has an inlet valve 46 through which reactant gas is introduced; and an outlet valve 48, downstream of which are a condenser 50 and a vacuum pump 52. The reactor 40 is heated, as represented by an electrical resistance heating element 54, although, again, a fueled-combustion heat source may as well be employed. Within the upflow reactor 40, heating may also be accomplished by placing coarse carbon particulate below the bed 42, introducing oxygen, and igniting. An upflow draft would be required for heat transfer through the bed 42. Representative access to the interior of the reactor 40 is via a removable lid 56. The condenser 50 may operate at room temperature, or may be chilled, depending upon the particular reaction products being recovered.

The operation of the FIG. 2 upflow reactor 40 is similar to that of the FIG. 1 downflow reactor 10. Particularly with the FIG. 2 upflow reactor 40, the reactant gas should be introduced slowly to avoid entraining the bed 42 particles. The beds 12 and 42 are fixed beds, not fluidized beds. Contact of the reactant gas with the particles within interstitial spaces is facilitated by the evacuation prior to introducing the reactant gas, rather than by a flow of reactant gas around and past the particles as in a fluidized bed reactor.

As a variation (not shown), a combination downflow/upflow reactor may be provided. By providing suitable valving, the same reactor may alternatively operated in a downflow mode as in FIG. 1 and in an upflow mode as in FIG. 2. Upflow aids in conditioning the bed.

Figure 3:
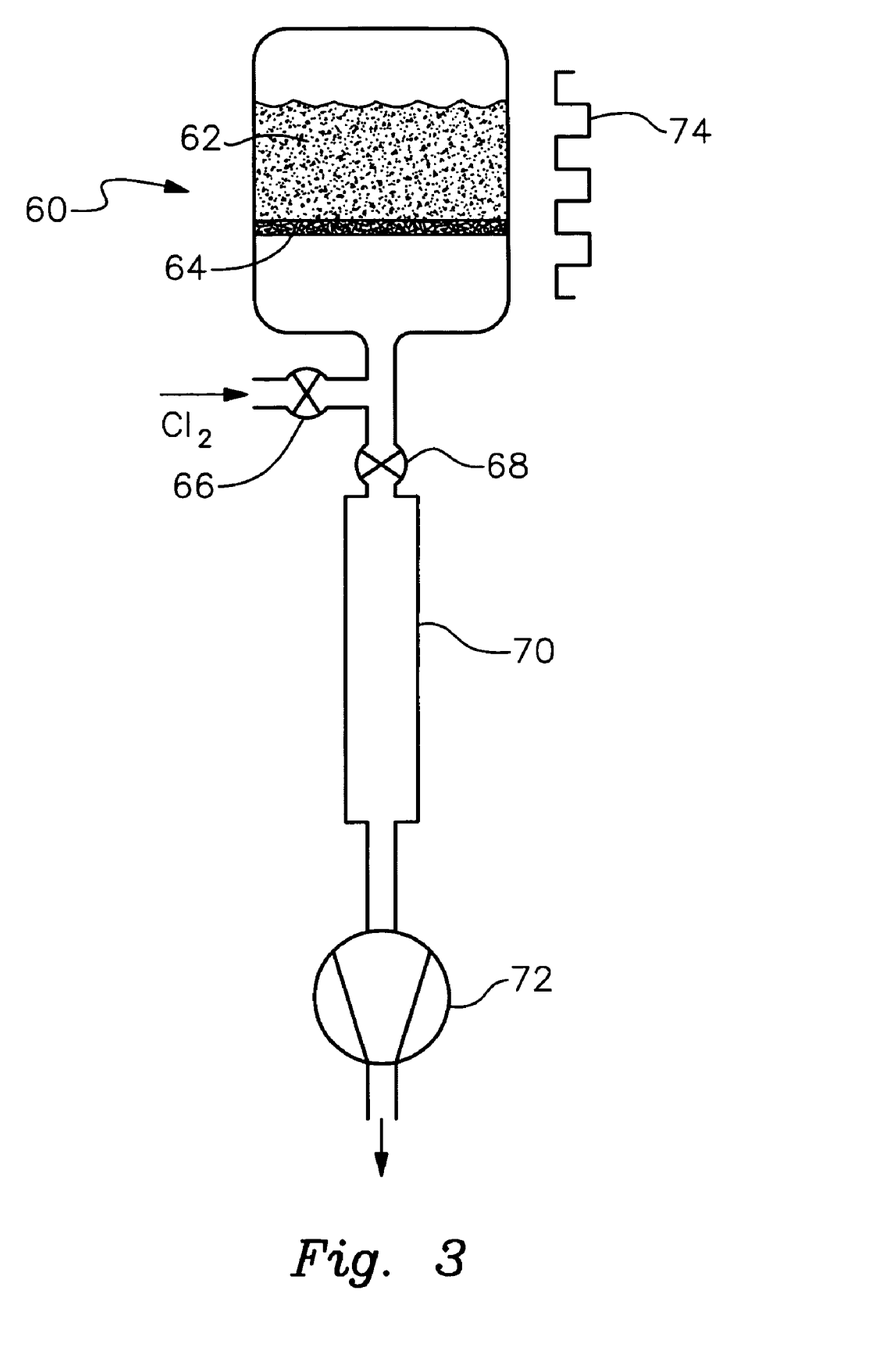
FIG. 3 is a schematic representation of apparatus for halogenation of an inorganic mineral, employing a reactor wherein a vacuum is pulled from under a bed and reactant gas is introduced from under the bed.

FIG. 3 is a representation of a reactor 60 which is closed at the top, and both the reactant gas is introduced and a vacuum is pulled from under a bed 62. The reactor 60 has an opening (not shown) through which the reactor 60 is charged to form the bed 62. The bed 62 again is a fixed bed 62, and is supported against gravity by a gas-permeable support 64. The reactor 60 has an inlet valve 66 through which reactant gas is introduced from the bottom, and an outlet valve 68 through which the reactor 60 is evacuated, also from the bottom. Downstream of the outlet valve 68 are a condenser 70 and a vacuum pump 72. The reactor 60 is heated, as represented by an electrical resistance heating element 74, although, again, a fueled-combustion heat source may as well be employed. The condenser 70 may operated at room temperature, or may be chilled, depending upon the particular reaction products being recovered.

The operation of the FIG. 3 reactor 60 is similar to that of either the FIG. 1 downflow reactor 10 or the FIG. 2 upflow reactor 40. In each case, contact of the reactant gas with the particles within interstitial spaces is facilitated by the evacuation prior to introducing the reactant gas, rather than by a flow of reactant gas around and past the particles as in a fluidized bed reactor.

Figure 4:
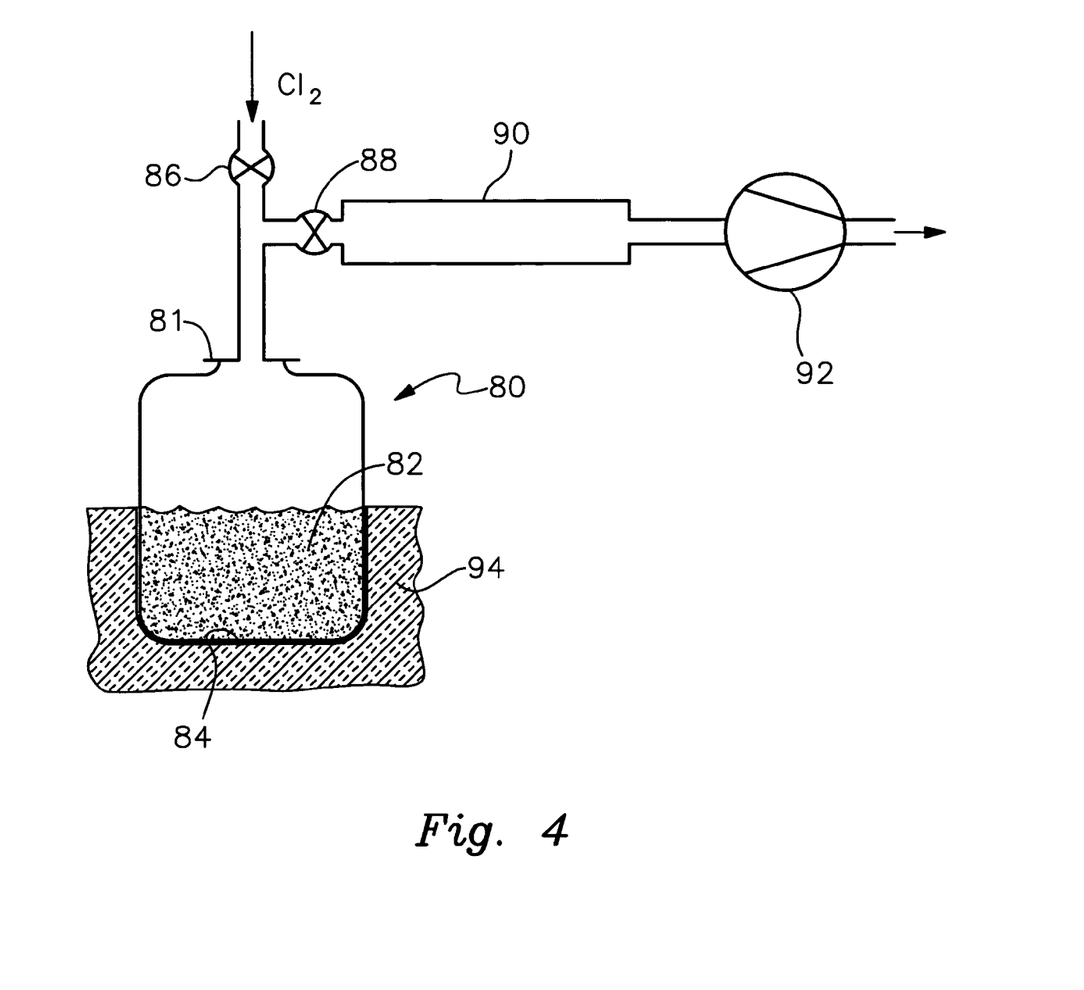
FIG. 4 is a schematic representation of apparatus for halogenation of an inorganic mineral, employing a reactor wherein a vacuum is pulled from above a bed and reactant gas is introduced from above the bed.

FIG. 4 represents yet another embodiment, a reactor 80 which is closed at the bottom, and wherein both the reactant gas is introduced and a vacuum is pulled from above a bed 82. Again, the reactor 80 has an opening, represented as a removable lid 81, through which the reactor 80 is charged to form the bed 82. The bed 82 again is a fixed bed 82. However, unlike the reactors of FIGS. 1, 2 and 3, the FIG. 5 reactor 80 does not require a gas-permeable support for the bed 82. Rather, the bed 82 rests directly on the bottom 84 of the reactor. The reactor 80 has an inlet valve 86 through which reactant gas is introduced from the top, and an outlet valve 88 through which the reactor 80 is evacuated, also from the top. Downstream of the outlet valve 88 are a condenser 90 and a vacuum pump 92. The condenser 90 may operated at room temperature, or may be chilled, depending upon the particular reaction products being recovered. The FIG. 4 reactor 80 is conveniently heated from its lower end, such as by being placed in an insulated heating chamber 94 containing either electrical heating elements or a fueled-combustion heat source. Residual bed 82 material is removed from the reactor 80 is removed by removing the lid 81 and inverting the reactor 80.

The operation of the FIG. 4 reactor 80 is similar to that of the embodiments described hereinabove. In each case, contact of the reactant gas with the particles within interstitial spaces is facilitated by the evacuation prior to introducing the reactant gas, rather than by a flow of reactant gas around and past the particles as in a fluidized bed reactor.

Discussion

Embodiments of the invention allow a reaction time sufficient to utilize a significant portion of the reactant (e.g. chlorine) before removing the products and unreacted chlorine in the evacuation portion of the cycle. A high degree of vacuum employed may serve to vaporize high boiling species formed in a reaction, e.g. lithium chloride (LiCl) from chlorination of lithium ore. In such an instance a longer period of evacuation is used to reduce the pressure beyond the point needed only for effective use of the chlorine. The higher vacuum allows vaporization of any liquid barrier that might slow down the reaction in the subsequent cycle or cycles.

A number of cycles are used to chlorinate the desired amount of the element or impurity in the bed. The amount of reactant involved in each cycle depends upon the interstitial volume of the bed which may include both ore solids and carbon (if carbo-chlorination) and, if desired, other inert material to provide increased interstitial space.

Increasing the pressure during the portion of the cycle when reactant gas is introduced into the reactor allows a reduction in the number of cycles by increasing the amount of reactant per cycle. Because both the amount of interstitial space and the reactant surface of the mineral particulate are directly proportional to the volume of the bed, production per cycle increases linearly with increased bed volume.

Embodiments of the invention differ from gas reaction processes employing a fluidized bed. Within a fluidized bed gas reaction is dependent upon the gas fluidization velocity and bed contact time as the gas passes through the bed. Moreover, the formation of bubbles as the bed deepens reduces the average gas contact time.

In embodiments of the invention gas-solid contact is a function of the interstitial volume, constant throughout the bed, multiplied by the sum of the cycle times. Diffusion distances are relatively small, resulting in better reactivity and higher reactant gas utilization. The reaction time can be adjusted during in the reaction phase to exactly a desired reaction time.

Thus, embodiments of the invention address the situation where a mineral is crushed to increase reactivity, but then is difficult to hold in a conventional fluidized bed reactor. In embodiments of the invention reaction gases occupy the voids in the bed for a sufficient time, which can be far in excess of the time during which they would be in contact in an upward passage through a bed of such fine particles in a fluidized bed reactor.

Accordingly, embodiments of the invention allow the use of ores of large specific surface area (relatively fine particles), and at the same time facilitate the control of reactant gas contact time. This is particularly significant in chlorination reactors for the recovery of lithium, for example, where reactivity is relatively low. Satisfying the dual requirements of processing relatively fine particle bed material and controlling reactant gas contact time with the bed is difficult if not impossible with fluidized bed reactors.

General Discussion of Lithium Extraction

As a particular example, embodiments of the invention may be employed to extract lithium as lithium chloride (LiCl) from lithium ore, such as spodumene, which in its pure form is lithium aluminum silicate ($LiAlSi_2O_6$). In the case of spodumene, other by-product chlorides are also extracted, principally aluminum chloride (AlCl3) and silicon tetrachloride ($SiCl_4$). Although the discussion below is primarily in the context of spodumene, with particular emphasis on the advantageous beta crystalline phase, it may be noted that there are other lithium ores, including lepidolite, $K(Li,Al)_3(Si,Al)_4O_{10}(F,OH)_2$; petalite, lithium aluminiumtectosilicate, $LiAlSi_4O_{10}$; and amblygonite $(Li,Na)Al(PO_4)(F,OH)$.

Lithium metal is subsequently produced by electrolysis of the lithium chloride, a conventional commercial process regardless of the source of lithium chloride.

Although traditionally lithium could be and was extracted from ore such as spodumene, for economic reasons certain brine pools (lakes) that are high in lithium, for example as the double salt $KLiSO_4$, are currently the major commercial source of lithium. As noted above, high temperature chlorination is an important process for producing titanium. However, application of high temperature chlorination techniques such as are applied in the titanium industry face a number of difficulties when applied to the extraction of lithium. As an example, lithium chloride has a much higher high boiling point (>1000° C.) compared to that of titanium tetrachloride (136.4° C.). As a result, the predominate amount of lithium chloride produced by reaction is not vaporized into the gas phase but remains on the surface of the crystalline particle of spodumene where it slows the reaction.

Moreover, lithium contained in ore is less reactive to carbon/chlorine and carbon monoxide/chlorine chlorination systems compared to titanium contained in ore. Fluidization, now employed worldwide in the titanium metal and titanium pigment industry, requires particle sizes too large to achieve a surface-to-volume ratio sufficient for effective chlorination of lithium ore. Thus, to address the reactivity deficiency in the case of lithium ore, an increase in surface area by size diminution is indicated, except for the resultant fluidization problems. Excessively fine material where the particle size is −200 mesh (75 μm) or smaller presents particular difficulties. Excessively fine material does not fluidize well. A typical approach is to agglomerate the excessively fine material, and then crush the agglomerated product to fluidizable sizes. This increases the processing cost and decreases reactivity due to the loss fine surface area. Embodiments of the invention do not require fluidization. Rather, fine particles are directly chlorinated.

Accordingly, lithium and accompanying elements within the ore (spodumene) are totally chlorinated at high temperature. The other crystal constituent chlorination products, aluminum and silicon chlorides, are very volatile at the chlorination temperatures needed. Lithium chloride is not.

Embodiments of the invention invoke at least a partial vacuum to vaporize lithium chloride. The process is conducted in cycles, using the interstitial gas to react with the mineral using accompanying bed carbon as the reductant in each cycle, of which there are many for complete chlorination of the ore.

The spodumene/carbon mixture is fed into the reactor, evacuated and chlorine allowed to fill the interstices to begin the reaction. The entire crystal is attacked and the volatiles produced by reaction, aluminum chloride and silicon tetrachloride, enter the interstices. The predominate amount of lithium chloride generated is not vaporized into the gas phase but remains on the surface of the crystal where it slows the reaction as the layer builds up with repeated cycling.

Following the reaction portion for the cycle the next stage is evacuation. Here, the volatiles and the combustion gas, CO and $CO_2$ flow down out of the reactor into a condenser. As the vacuum improves to the evaporating level, lithium chloride leaves the bed and enters the condenser.

Lithium chloride tends to block the overall chlorination reaction. However, when the vacuum is increased to where lithium chloride is significantly vaporized the ore particle surface again becomes available for the chlorination attack. This need not occur in every cycle.

As the lithium chloride builds up on the surface the chlorination rate goes down. It is not necessary to go to high vacuum at the end of each cycle. The bed needs to be evacuated only far enough to allow more reactant gas into the interstices to replace the gas reacted. But, when the reaction rate has declined substantially, then the reactor can be pumped down to a higher vacuum to clear the lithium chloride product to a condenser.

Increasing the interstitial volume allows more reaction per cycle as does increased pressure of entering chlorine. Large sized carbon particles act as spacers to increase the amount of voids. Carbon in the form of particles of small dimensions is essential to the reaction, and must be present in an amount above the stoichiometric amount needed for lithium and iron removal.

Lithium Extraction by Chlorination of Beta Spodumene

Important embodiments of the invention relate to the extraction of lithium as lithium chloride (LiCl) from lithium ore, such as spodumene, which in its pure form is lithium aluminum silicate ($LiAlSi_2O_6$). Impurities including iron and sodium are also typically present in the ore. Spodumene naturally occurs as the alpha crystalline phase, and the discussion herein up to this point primarily is in the context of chlorination of spodumene in its alpha crystalline phase.

Spodumene can be changed to the beta crystalline phase by calcining at a minimum temperature of 1040° C. When beta spodumene is chlorinated at a temperature in the order of 1000° C., lithium is preferentially removed, with very little of the other components (aluminum and silicon) forming chlorides. The rate of lithium extraction by chlorination of beta spodumene is approximately ten times the rate of lithium extraction by chlorination of alpha spodumene. It is believed that calcining to the beta crystalline phase opens up the crystal structure in a way which allows better contact of the chlorine with the lithium atoms within the crystal structure. The high selectivity for extraction of lithium when the beta crystalline phase of spodumene is employed is significant.

Thus, lithium extraction may be accomplished with either the alpha crystalline phase or the beta crystalline phase of spodumene. When the alpha crystalline phase is chlorinated, all components of the spodumene (predominantly iron, aluminum, lithium, sodium and silica) must be removed as chlorides. In other words, the reaction products are all gaseous reaction products including lithium chloride, aluminum chloride and silicon tetrachloride, which are all removed from the reactor. The reaction produces all components at relatively equal rates in proportion to the amount present of each component. All of the alpha spodumene needs to be reacted to recover all of the lithium. In other words, the bed is 100% consumed by the chlorination process.

However, when the beta crystalline phase is chlorinated, iron chloride is removed first and then the lithium is preferentially removed, with very little of the other components forming chlorides. The reaction products are lithium chloride and a residual bed material. Significantly, a minimum of 90% of the lithium can be removed and collected as lithium chloride, while approximately 85% by weight of the spodumene remains in the bed. Moreover, chlorination of beta spodumene requires less chlorine (since less material will need to be chlorinated), and much less time. The rate of chlorination of the lithium is much faster for beta spodumene beta compared to alpha spodumene. In addition, a mineral that has potential economic value is left behind in the bed. The remaining bed is essentially spodumene with very little lithium. This is an alumino silicate mineral that has potential economic value in ceramic, glass and filler industries.

Another characteristic of spodumene is that the beta crystalline phase is softer than the alpha crystalline phase, and accordingly easier to grind down to an appropriate particle size (e.g. −325 mesh) for forming a bed. One process sequence is providing alpha spodumene; grinding the alpha spodumene to produce particles of alpha spodumene; calcining the alpha spodumene particles to produce particles of beta spodumene, and forming a bed of the beta spodumene particles; and chlorinating the bed and removing lithium as lithium chloride leaving the alumino silicate residual bed material. Another process sequence, which takes advantage of the softer beta spodumene, is providing alpha spodumene; calcining the alpha spodumene to produce beta spodumene; then grinding the beta spodumene to produce particles of beta spodumene, and forming a bed of the beta spodumene particles; and chlorinating the bed and removing lithium as lithium chloride, leaving the alumino silicate residual bed material.

It will be appreciated that, although the calcining of alpha spodumene to beta spodumene and then chlorinating the beta spodumene is disclosed hereinabove in the context of a cyclical batch process aided by vacuum, other chlorination processes, including those employing prior art fluidized reactors, shaft flow reactors and conveying reactors may as well be employed. Thus, in some embodiments of the invention lithium is extracted as lithium chloride from lithium ore in the form of spodumene, by calcining the spodumene to produce beta spodumene, chlorinating the beta spodumene in a reactor, and removing reaction products including lithium chloride from the reactor. One particular process sequence includes the steps of calcining the spodumene to produce beta spodumene, and then grinding the calcined spodumene to produce particles of beta spodumene to be chlorinated in the reactor. Another particular process sequence includes the steps of grinding the spodumene ore to produce particles of alpha spodumene, and then calcining the particles of alpha spodumene to produce beta spodumene to be chlorinated in the reactor.

EXAMPLE I

To purify quartz to extreme levels it has been proposed to reduce it to extreme particle size say −325 mesh, to expose surfaces of fine inclusions. Chlorination of the exposed inclusions vaporizes the inclusion impurities or converts them to soluble chlorides, upgrading the quartz significantly.

Quartz from a spodumene mine containing 40 ppm lithium as spodumene was reduced to −325 mesh, whereupon the tapped bulk density is about 1.712 g/cc. Using the true density of 2.65 g/cc the void space can be calculated to be about 54.8% or 0.385 cc/g. Evacuating the voids and allowing a chlorinating mixture of CO/Cl to flow into the void space and come to the inlet gas stream pressure and the solids temperature, the chlorination reaction begins at the exposed impurity surfaces.

After sufficient time to react substantially all of the reactant gas mixture the resulting product chloride gas mixture is evacuated with a vacuum pump. At 600° C., 2 Atm. (50% Cl), 7 cycles are required. At 900° C., 9.4 cycles are required.

EXAMPLE II

Where it is desired to use Downflow Chlorination to chlorinate substantial amounts of product the number of cycles increases enormously although the void space is proportional to the bed volume. Here, the use of pressure linearly decreases the number of cycles needed.

Using 1 gram mol of theoretical spodumene, totally attacked as evidence in fluidization runs, 5 mols of chlorine and carbon monoxide are needed. Ground to −325 mesh, the void space calculated from the tapped bulk density and the mineral density, 1.56 g/cc and 3.2 g/cc, yields 0.334 cc/g of spodumene. At 600° C., 2 Atm, 5779 cycles are required. With automated gas valving and vacuum pump extraction, 4 cycles/minute 4 or 2 hours. At 10 Atm total pressure 5 hours is needed per batch. Time is independent of batch size and pressure aids addition and extraction.

EXAMPLE III

Gold powder is very difficult to fluidize. As a high value high molecular weight low temperature reactant with chlorine it is very amenable to Downflow Chlorination. Similarly, platinum and dental gold—PGM alloys can use this technique.

Inquarting the dental alloy with 50% by weight copper and employing the process under U.S. Pat. No. 5,004,500 used commercially by Browning Resources USA, to convert to a fine gold and platinum alloy powder, one makes a fine powder of about 60% voids. Introducing this into a Downflow Chlorination metallic reactor, electrically heated externally with a fritted disc support of similar metal of (70 to 100 micron porosity), one can chlorinate with cycles of gas introduction, reaction period at full pressure followed by vacuum extraction of product chlorides.

If the reaction time is sufficient to use substantially all of the chlorine and carbon monoxide, there is practically no effluence of reacting gases, only precious metal chlorides which are condensed. Depending upon the amount of copper Inquarting the particle size and reactivity vary as well as the cycle time.

Using an overall cycle time of 10 seconds for gas inflow, reaction time at temperature and exhaustion by vacuum pump, one can calculate the production rate. It again should be noted that the entire bed is reacting simultaneously so the reactor volume will determine the throughput based on the following calculation:

Gold has an atomic weight of 196.96, a density of 19.3 g/cc. The inverse is 0.052 cc/g. Assuming a 60% void space for gold powder after the copper removal process, the void space is 0.031 cc per gram. Chlorination to $AuCl_3$ requires 1.5 mols of chlorine, which has a volume of $$22.41 \times (573/273)(1.5) = 70.5 \text{ liters at reaction temperature of } 300° C.$$

For the void space of 0.031 cc/g and 10 second cycles total chlorination would take 32 hours or less as the void space decreases: $10 \times (2,274,240)/3600(196.96) = 32$ hours. Running at 10 Atm using a metal reactor, 3.2 hrs.

EXAMPLE IV

Extraction of Lithium from Beta-Spodumene

The following TABLE shows the results of extracting lithium from spodumene which has been calcined to its beta crystalline phase. The assays are of the bed before and after high temperature chlorination, and illustrate the preferential extraction of lithium.

TABLE

| Constituent | Assay (%) Before Chlorination | Assay (%) After Chlorination |
| --- | --- | --- |
| $SiO_2$ | 64.89 | 84.93 |
| $Al_2O_3$ | 26.97 | 12.76 |
| $Fe_2O_3$ | 0.50 | 0.15 |
| CaO | 0.033 | 0.14 |
| $TiO_2$ | 0.015 | 0.038 |
| MgO | 0.007 | 0.023 |
| $Na_2O$ | 0.25 | 0.055 |
| $K_2O$ | 0.095 | 0.23 |
| MnO | 0.051 | 0.005 |
| $Li_2O$ | 5.66 | 0.5 |

EXAMPLE V

Extraction of Iron from Beta-Spodumene

The following TABLE shows the results of extracting iron from spodumene which has been calcined to its beta crystalline phase. The assays are of the bed before and after high temperature chlorination.

TABLE

| Constituent | Assay (%) Before Chlorination | Assay (%) After Chlorination |
| --- | --- | --- |
| $Fe_2O_3$ | 0.18 | 0.009 |
| $Al_2O_3$ | 28.62 | 28.9 |
| $Li_2O$ | 7.94 | 6.59 |

EXAMPLE VI

Beneficiation of KyaniteKyanite

The following TABLE shows the results of extracting iron from kyanite (empirical formula $Al_2SiO_5$ in its pure form). The assays are of the bed before and after high temperature chlorination.

TABLE

| Constituent | Assay (%) Before Chlorination | Assay (%) After Chlorination |
| --- | --- | --- |
| $Al_2O_3$ | 52.07 | 57.97 |
| $SiO_2$ | 40.02 | 40.86 |
| Total $Fe_2O_3$ | 5.71 | 0.05 |
| $K_2O$ | 0.04 | 0.00 |
| MgO | 0.22 | 0.23 |
| CaO | 0.02 | 0.02 |
| $Na_2O$ | 0.00 | 0.00 |
| $P_2O_5$ | 0.15 | 0.12 |
| $TiO_2$ | 1.29 | 0.96 |
| Kyanite | 82.7 | 92.06 |
| Quartz | 9.57 | 6.76 |
| Pyrite | 0.34 | 0.00 |

In view of the foregoing, it will be appreciated that embodiments of the invention provide chlorination reactors and processes especially adapted to fine particle slow reacting oxide ores where the chloride product or products may be of low vapor pressure even at high reaction temperatures. This avoids needing agglomeration of the fines to reach fluidizable particle size and avoids slowing the reaction by occluding particle surface in the agglomerated material. Embodiments of the invention are also adaptable to any material that is unable to be fluidized or other wise processed in existing reactor methods due to an undesirable particle size distribution of the material to be processed. Embodiments of the invention are also effective on any-material amenable to chlorination by any existing reactor technology. Embodiments of the invention are applicable to any material of any size distribution subjected to chlorination. There are particular advantages in chlorinating beta spodumene produced by calcining naturally-occurring alpha spodumene.

While particular embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A process for chlorination of spodumene, comprising the steps of:
    charging a reactor with spodumene particles mixed with carbon particles as a reductant to form a bed; and
    for a plurality of cycles, cycling through the steps of
        evacuating the reactor under at least a partial vacuum,
        introducing chlorine as a reactant gas into the reactor,
        maintaining the reactant gas within the reactor and in contact with the particles for a predetermined reaction time, and
        removing gaseous reaction products from the reactor under at least a partial vacuum.

2. The process of claim 1, which further comprises heating the reactor and bed to an elevated temperature.

3. The process of claim 1, wherein, during said step of removing gaseous reaction products, vacuum sufficient to vaporize all chloride reaction products is employed.

4. The process of claim 1, wherein the reactor is at least partially evacuated from under the bed.

5. The process of claim 4, wherein the reactant gas is introduced from under the bed.

6. The process of claim 4, wherein the reactant gas is introduced from above the bed.

7. The process of claim 1, wherein the reactor is at least partially evacuated from above the bed.

8. The process of claim 7, wherein the reactant gas is introduced from under the bed.

9. The process of claim 7, wherein the reactant gas is introduced from above the bed.

10. The process of claim 1, wherein the reactor is charged with particles of a size in the order of −325 mesh.

11. A process for chlorination of spodumene, comprising the steps of:
    charging a reactor with spodumene particles to form a bed; and
    for a plurality of cycles, cycling through the steps of
        evacuating the reactor under at least a partial vacuum,
        introducing chlorine as a reactant gas mixed with carbon as a reductant in the form of carbon monoxide gas into the reactor,
        maintaining the reactant gas within the reactor and in contact with the particles for a predetermined reaction time, and
        removing gaseous reaction products from the reactor under at least a partial vacuum.

12. The process of claim 11, which further comprises heating the reactor and bed to an elevated temperature.

13. The process of claim 11, wherein, during said step of removing gaseous reaction products, vacuum sufficient to vaporize all chloride reaction products is employed.

14. The process of claim 11, wherein the reactor is at least partially evacuated from under the bed.

15. The process of claim 14, wherein the reactant gas is introduced from under the bed.

16. The process of claim 14, wherein the reactant gas is introduced from above the bed.

17. The process of claim 11, wherein the reactor is at least partially evacuated from above the bed.

18. The process of claim 17, wherein the reactant gas is introduced from under the bed.

19. The process of claim 17, wherein the reactant gas is introduced from above the bed.

20. The process of claim 11, wherein the reactor is charged with particles of a size in the order of −325 mesh.

21. A process for extracting lithium as lithium chloride from lithium ore, comprising the steps of:
   charging a reactor with particles produced from the ore to form a bed;
   heating the reactor and bed; and
   for a plurality of cycles, cycling through the steps of
      evacuating the reactor under at least a partial vacuum,
      introducing chlorine gas into the reactor,
      maintaining reactant gas within the reactor and in contact with the particles for a predetermined reaction time; and
      removing gaseous reaction products including lithium chloride, as a gas, from the reactor under at least a partial vacuum.

22. The process of claim 21, wherein, during said step of removing gaseous reaction products, vacuum sufficient to vaporize all chloride reaction products is employed.

23. The process of claim 21, wherein carbon particles as a reductant are mixed with the particles produced from the lithium ore to form the bed.

24. The process of claim 21, wherein carbon in the form of carbon monoxide is mixed with the chlorine gas introduced into the reactor.

25. The process of claim 21, which comprises charging the reactor with particles of spodumene as the particles produced from the lithium ore.

26. The process of claim 21, which further comprises:
   providing spodumene as the lithium ore; and
   grinding the spodumene to produce particles of alpha spodumene as the particles produced from the lithium ore for charging the reactor; and wherein:
   gaseous reaction products include lithium chloride, aluminum chloride and silicon tetrachloride.

27. The process of claim 21, which further comprises:
   providing spodumene as the lithium ore;
   calcining the spodumene to produce beta spodumene; and
   grinding the calcined spodumene to produce particles of beta spodumene as the particles produced from the lithium ore for charging the reactor; and wherein:
   reaction products include lithium chloride and a residual bed material.

28. The process of claim 21, which further comprises condensing lithium chloride gas removed from the reactor to produce solid lithium chloride.

* * * * *